US010921114B2

(12) United States Patent
Fuyuno et al.

(10) Patent No.: US 10,921,114 B2
(45) Date of Patent: Feb. 16, 2021

(54) OPTICAL DISPLACEMENT METER

(71) Applicant: Keyence Corporation, Osaka (JP)

(72) Inventors: Akira Fuyuno, Osaka (JP); Yoshitaka Tsuchida, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/823,363

(22) Filed: Mar. 19, 2020

(65) Prior Publication Data

US 2020/0340799 A1 Oct. 29, 2020

(30) Foreign Application Priority Data

Apr. 26, 2019 (JP) ............................. JP2019-085198

(51) Int. Cl.
*G01B 11/02* (2006.01)
*G01B 11/06* (2006.01)

(52) U.S. Cl.
CPC ................................ *G01B 11/0608* (2013.01)

(58) Field of Classification Search
CPC ......... G01B 11/24; G01B 11/14; G01B 11/25; G01B 11/2518; G01B 11/026; G01B 11/2545; G01B 11/0608; G01B 11/2513; G01B 11/02; G01B 11/254; G02B 21/06; G06T 7/60; G06T 7/521; G06T 7/593; A61B 5/0095; H04N 7/18; G01C 3/08
See application file for complete search history.

(56) References Cited

U.S. PATENT DOCUMENTS

2016/0261791 A1* 9/2016 Satoyoshi .......... H04N 5/23293
2017/0329012 A1* 11/2017 Buttgen .................. G01S 17/48
2020/0049487 A1 2/2020 Tsuchida
2020/0049490 A1 2/2020 Tsuchida

FOREIGN PATENT DOCUMENTS

JP 200896125 A 4/2008
JP 2012103266 A 5/2012

OTHER PUBLICATIONS

U.S. Appl. No. 16/823,364, filed Mar. 19, 2020 (41 pages).
U.S. Appl. No. 16/823,365, filed Mar. 19, 2020 (52 pages).
U.S. Appl. No. 16/823,366, filed Mar. 19, 2020 (83 pages).

* cited by examiner

*Primary Examiner* — Mesfin T Asfaw
(74) *Attorney, Agent, or Firm* — Kilyk & Bowersox, P.L.L.C.

(57) ABSTRACT

A light source irradiates the measuring object with slit light having a width in an X direction. An image sensor receives reflected light from the measuring object, has a plurality of pixels two-dimensionally arranged in a U direction corresponding to the X direction and a V direction corresponding to a Z direction, and outputs a light receiving amount of the reflected light. A detecting unit detects a position of a pixel in the V direction. A generating unit generates a profile of the X-Z cross section from each position of the plurality of pixel rows in the U direction and the peak position in the V direction. A resolution in the V direction of the image sensor is lower than a resolution in the U direction of the image sensor.

7 Claims, 8 Drawing Sheets

OPTICAL DISPLACEMENT METER

CROSS-REFERENCE TO RELATED APPLICATIONS

The present application claims foreign priority based on Japanese Patent Application No. 2019-085198, filed Apr. 26, 2019, the contents of which are incorporated herein by reference.

BACKGROUND OF THE INVENTION

1. Field of the Invention

The present invention relates to an optical displacement meter.

2. Description of Related Art

An optical displacement meter of a light sectioning method has been proposed in order to measure a height in a Z direction of a measuring object (workpiece) conveyed in a Y direction by a conveyor (JP-A-2008-096125, JP-A-2012-103266).

A direction orthogonal to the Y direction and the Z direction is an X direction, and the workpiece is placed on an XY plane. The optical displacement meter irradiates the workpiece with slit light having a width in the X direction, and receives reflected light from the workpiece with an image sensor arranged two-dimensionally. A light projecting direction of the slit light and a light receiving direction of the image sensor are inclined, and the height of the workpiece is calculated based on a principle of triangulation. Such an optical displacement meter of the light sectioning method can acquire a contour (profile) of an X-Z cross section of the workpiece at once. By repeatedly performing imaging while conveying the workpiece in the Y direction, profiles at different positions in the Y direction are acquired. Further, data indicating a three-dimensional shape of the workpiece is obtained from a plurality of profiles.

SUMMARY OF THE INVENTION

A plurality of pixels included in the image sensor are arranged on a UV plane. The U direction of the image sensor corresponds to the X direction of the workpiece. The V direction of the image sensor corresponds to the Z direction of the workpiece. In a word, the position of the pixel where the reflected light is incident in the V direction indicates the height of the workpiece in the Z direction.

In order to increase the number of workpieces that can be measured per unit time, it is necessary to increase conveying speed of the conveyor. Moreover, it is necessary to speed up the time for reading measurement results from all pixels included in the image sensor.

As a high-speed reading technique for an image sensor, there is a method called binning. In binning, by treating n×n pixel groups as one lump, it becomes possible to read at once a measurement result obtained by synthesizing n×n pixel groups. However, in such a binning, a measurement accuracy in both the U direction and the V direction is decreased to 1/n, and thus it cannot be adopted in the optical displacement meter of the light sectioning method where a high measurement accuracy is required. Therefore, an object of the invention is to speed up reading in the V direction while suppressing a decrease in the measurement accuracy in the U direction in the optical displacement meter of the light sectioning method.

The invention provides, for example, an optical displacement meter of a light sectioning method which measures a profile of an X-Z cross section of a measuring object conveyed in a Y direction based on a principle of triangulation, the optical displacement meter including: a light source which irradiates the measuring object with slit light having a width in an X direction; an image sensor that receives reflected light from the measuring object, the image sensor having a plurality of pixels two-dimensionally arranged in a U direction corresponding to the X direction and a V direction corresponding to a Z direction, and outputting a light receiving amount of the reflected light by the plurality of pixels; a detecting unit which detects, as a peak position, a position of a pixel in the V direction that is a peak of the light receiving amount for each of a plurality of pixel rows arranged in the U direction; and a generating unit which generates a profile of the X-Z cross section from each position of the plurality of pixel rows in the U direction and the peak position in the V direction, wherein the image sensor outputs a light receiving amount after executing binning to make a resolution in the V direction lower than a resolution in the U direction.

According to the invention, it is possible to speed up the reading in the V direction without a decrease in the measurement accuracy in the U direction.

DESCRIPTION OF EMBODIMENTS

Figure 1:
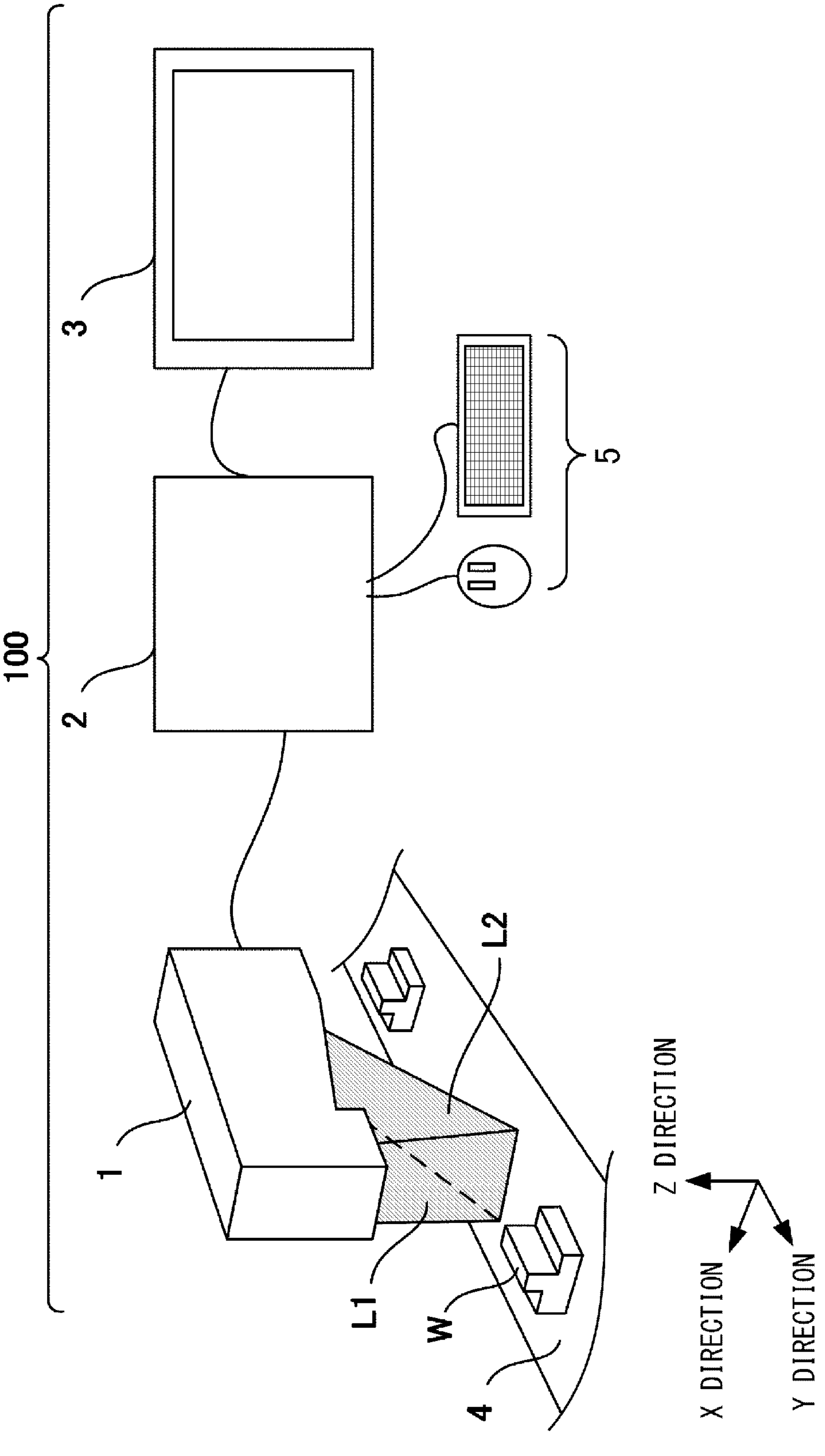
FIG. 1 is a diagram illustrating an optical displacement meter.

Embodiments will be described in detail below with reference to the attached drawings. The following embodiments are not intended to limit the invention according to the claims, and all combinations of features described in the embodiments are not necessarily essential to the invention. Two or more features of a plurality of features described in the embodiments may be arbitrarily combined. In addition, same or similar components are given the same reference numeral, and redundant description is omitted.

<Optical Displacement Meter>

FIG. 1 is a diagram showing an optical displacement meter 100. The optical displacement meter 100 is an apparatus that measures a profile and a three-dimensional shape of a workpiece W conveyed in a Y direction by a belt conveyor 4. In this example, a Z direction corresponds to a height direction of the workpiece W. A head section 1 outputs slit light L1 parallel to an XZ plane and receives reflected light L2 from the workpiece W, thereby outputting a light receiving result to a control section 2. The control section 2 calculates a profile of the workpiece W based on the light receiving result output from the head section 1. The control section 2 may be integrated with the head section 1. The profile is data indicating an outer edge of a cut surface of the workpiece W parallel to the XZ plane. For example, the profile is an aggregate of (xi, zi) (i is an index). The xi indicates a position in the X direction. The zi indicates a height in the Z direction. The three-dimensional shape is an aggregate of (xi, yi, zi). The yi indicates a position in the Y direction. The control section 2 obtains profiles (xi, zi) of the workpiece W having different y is by causing the head section 1 to perform imaging at regular intervals. A display device 3 displays a measurement result of the workpiece W by the optical displacement meter 100, and displays a UI (user interface) for performing a setting of the optical displacement meter 100. An operating section 5 is an input device for receiving a user input to the optical displacement meter 100.

<Principle of Three-Dimensional Distance Measurement>

Figure 2:
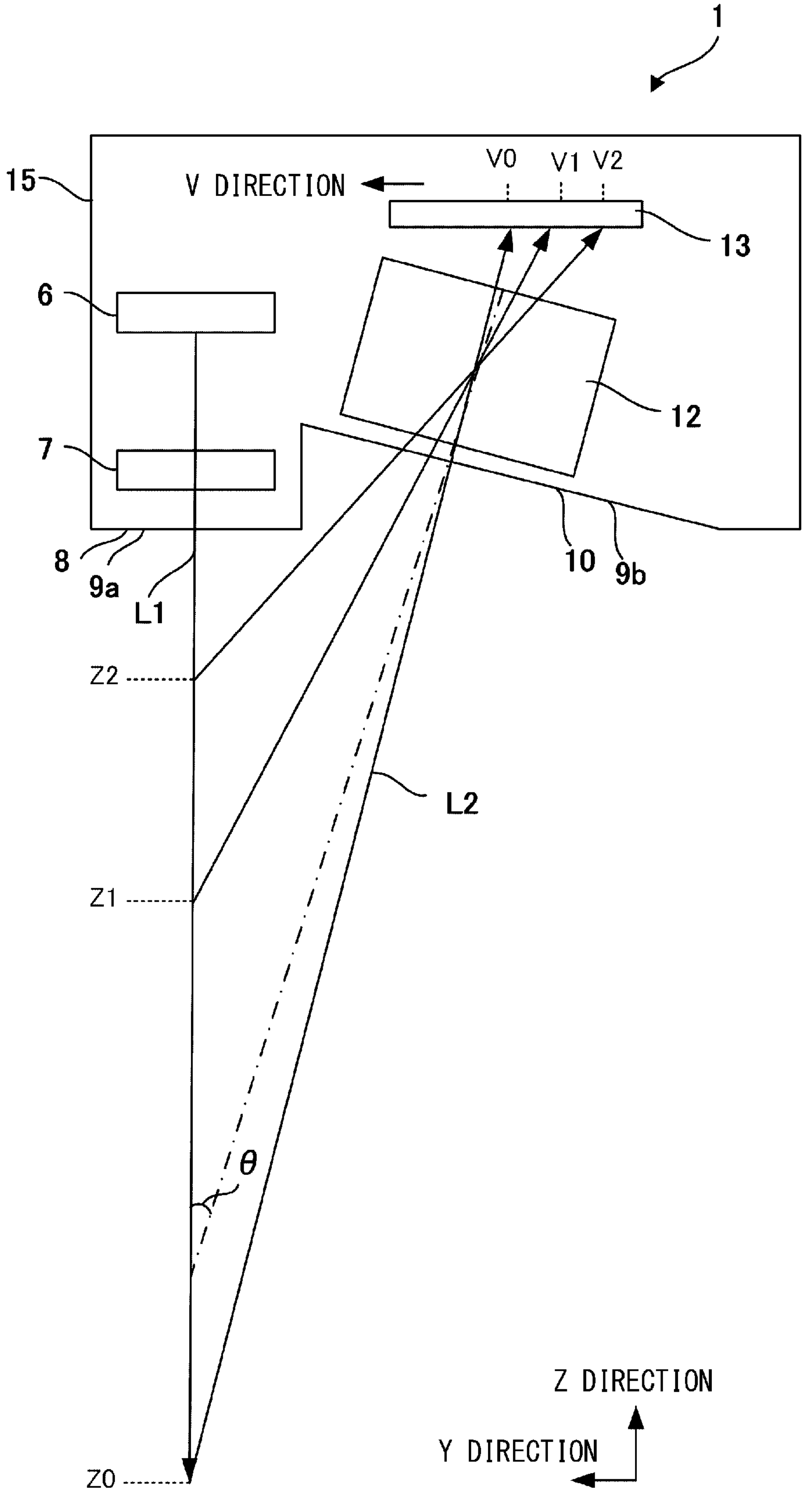
FIG. 2 is a diagram illustrating the principle of triangulation.

FIG. 2 is a diagram illustrating a principle of a light sectioning method (triangulation). A light source 6, a light projecting lens 7, a light receiving lens 12, and an image sensor 13 are integrated inside a housing 15 of the head section 1. Light output from the light source 6 is converted into the slit light L1 by passing through the light projecting lens 7. A light transmitting window 8 through which the slit light L1 passes is provided on the housing 15. A light transmitting glass 9*a* for dust proof is provided on the light transmitting window 8. Similarly, a light receiving window 10 for guiding the reflected light L2 into the interior of the housing 15 is provided on the housing 15. A light transmitting glass 9*b* for dust proof is provided on the light receiving window 10. The light receiving lens 12 is a lens for forming an image of the reflected light L2 on the image sensor 13. The image sensor 13 is a sensor having a plurality of pixels (which may be called light receiving elements or photoelectric converting elements) arranged two-dimensionally. As shown in FIG. 2, a light receiving axis of the image sensor 13 is inclined by an angle θ relative to a light projecting axis of the light source 6. That is, the reflected light L2 from a height Z0 forms an image at a position of V0 in the V direction of the image sensor 13. The reflected light L2 from a height Z1 forms an image at a position of V1 in the V direction of the image sensor 13. The reflected light L2 from a height Z2 forms an image at a position of V2 in the V direction of the image sensor 13. In this way, the V direction of the image sensor 13 corresponds to the Z direction of the workpiece W. Although the U direction of the image sensor 13 is not shown, the U direction corresponds to the X direction of the workpiece W. In a word, a vertical direction of an image which is a light receiving result output by the image sensor 13 is the V direction, and a lateral direction is the U direction.

The light source 6 is arranged such that the slit light L1 is output in the Z-axis direction in FIG. 2. However, the positional relation between the pair of the light source 6 and the light projecting lens 7, and the pair of the image sensor 13 and an imaging lens 12 may be reversed.

Figure 3:
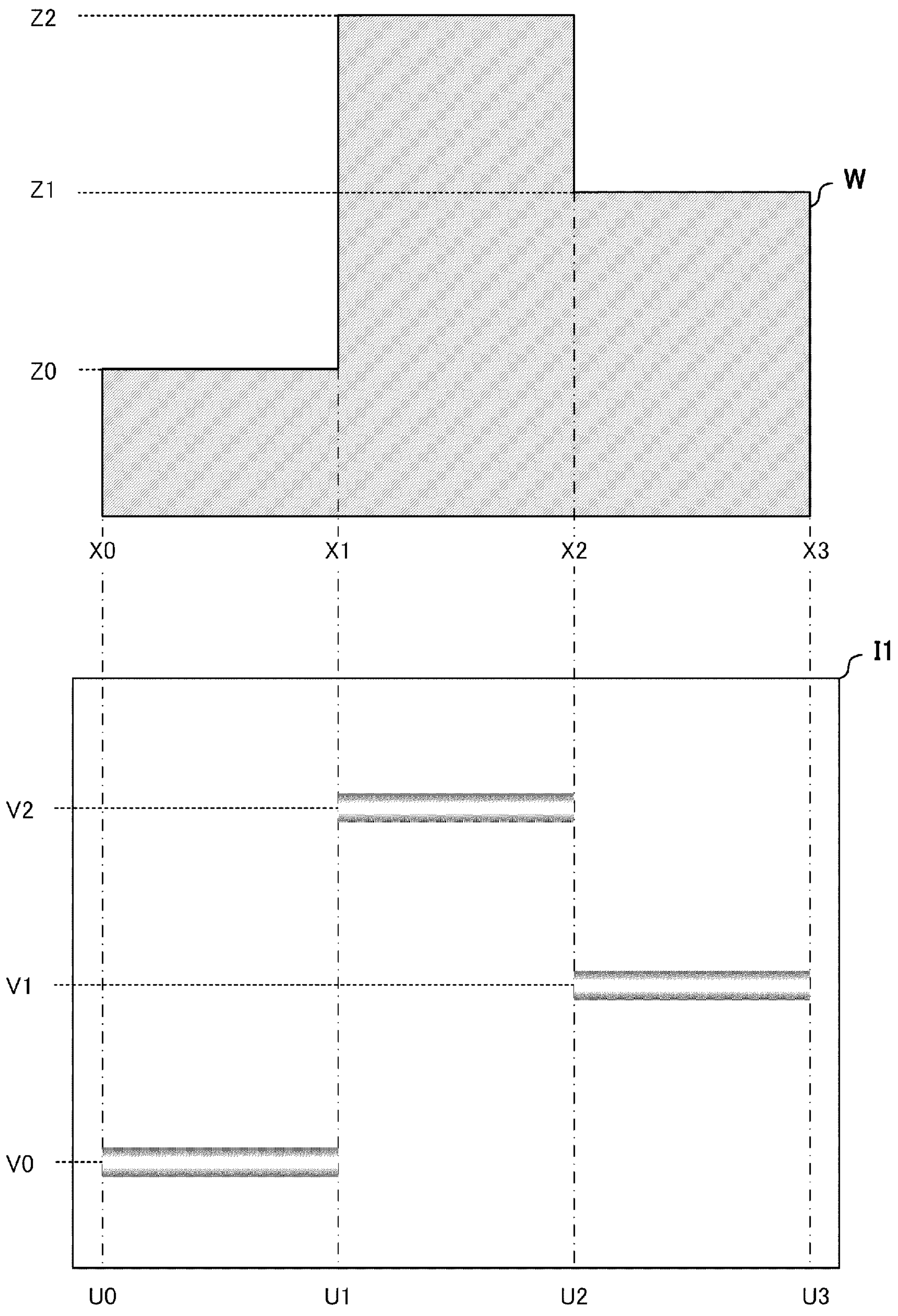
FIG. 3 is a diagram illustrating a measurement of a profile.

FIG. 3 is a diagram illustrating a relation between an image I1 output by the image sensor 13 and a cross section of the workpiece W. In this example, the height in the XZ cross section of the workpiece W changes in three stages. More specifically, the height from position X0 to position X1 in the X direction is Z0. The height from the position X1 to position X2 is Z2. The height from the position X2 to position X3 is Z1. The image I1 is an image obtained by imaging such a workpiece W with the head section 1. The U direction (lateral direction) of the image I1 corresponds to the X direction of the workpiece W. That is, positions U0, U1, U2, and U3 of the image I1 correspond to positions X0, X1, X2, and X3, respectively. Similarly, positions V0, V1, and V2 in the V direction of the image I1 correspond to heights Z0, Z1, and Z2, respectively. A light spot (an aggregate of reflection positions) formed by the incidence of the slit light L1 on the XY plane is linear. That is, when the workpiece W is not present on the belt conveyor 4, substantially linear light spots are arranged on the image output by the head section 1. On the other hand, generally a height of an edge of a cut surface of the workpiece W is often not constant. In this case, as shown in FIG. 3, the light spots are arranged at positions in the V direction corresponding to each of a plurality of heights. FIG. 2 shows that the position in the V direction changes corresponding to the height. The control section 2 generates a profile by calculating a position in the V direction for each position in the U direction from an image IM acquired at a position in a certain Y direction. Since there is a constant scale relation between the XZ coordinate system and the UV coordinate system, the control section 2 can convert a profile in the UV coordinate system into a profile in the XZ coordinate system by a simple calculation.

<Internal Function>

Figure 4:
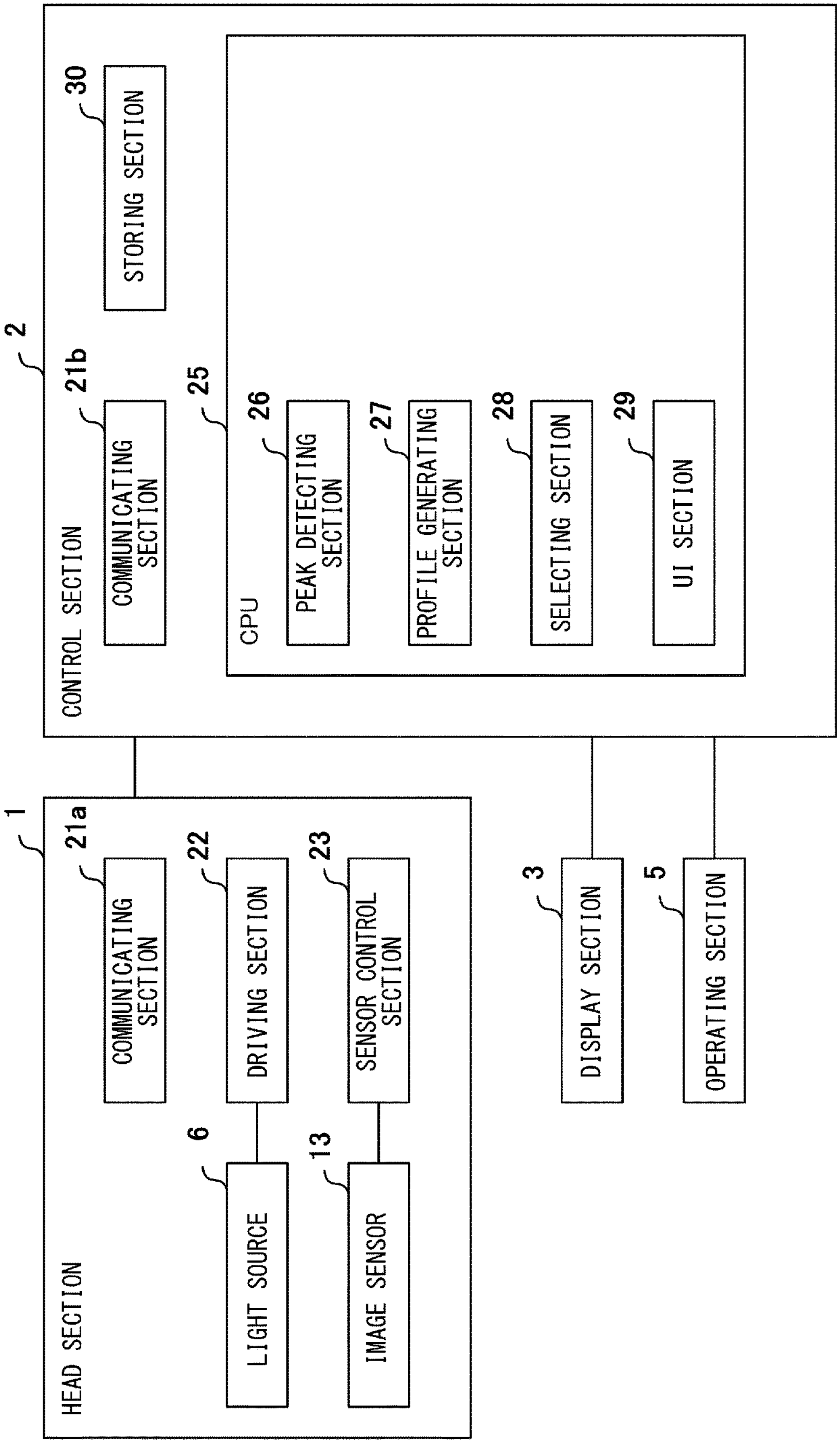
FIG. 4 is a diagram illustrating functions included in the optical displacement meter.

FIG. 4 shows internal functions of the optical displacement meter 100. A communicating section 21*a* of the head section 1 is a communication circuit for communicating with the control section 2. A driving section 22 is a driving circuit that turns on the light source 6 by supplying a driving current to the light source 6 according to an instruction from the control section 2 received via the communicating section 21*a*. A sensor control section 23 is a control circuit that causes the image sensor 13 to perform imaging with a predetermined exposure time according to an instruction from the control section 2 received via the communicating section 21*a*. In the present embodiment, the sensor control section 23 causes the image sensor 13 to execute predetermined binning according to an instruction from the control section 2 received via the communicating section 21*a*.

A communicating section 21*b* of the control section 2 is a communication circuit for communicating with the head section 1. A CPU 25 controls the head section 1 by executing a control program stored in a storing section 30, and measures a profile and a three-dimensional shape of the workpiece W based on a light receiving result output from the head section 1. A peak detecting section 26 detects a position (peak position) in the V direction which brings a peak of a luminance value based on the light receiving result output by the image sensor 13. The peak position corresponds to the height of the workpiece W. In a word, the peak detecting section 26 obtains a height of the workpiece W at each position in the X direction by calculation. A profile generating section 27 generates one profile data by collecting the height (zi) of the workpiece W for each position (xi) in the X direction obtained by the peak detecting section 26. That is, one profile data is an aggregate of a plurality of heights (zi). The profile generating section 27 obtains profile data for different positions (yi) in the Y direction, and generates data indicating a three-dimensional shape of the workpiece W from the obtained plurality of profile data. The data of the three-dimensional shape of the workpiece W is an aggregate of the obtained plurality of profile data. A selecting section 28 selects a binning ratio, which will be described later, based on a user instruction input from the operating section 5. A UI section 29 displays the profile data obtained by the profile generating section 27 or the image I1 on the display device 3, and displays a UI for selecting a binning ratio on the display device 3.

<Binning>

Figure 5A:
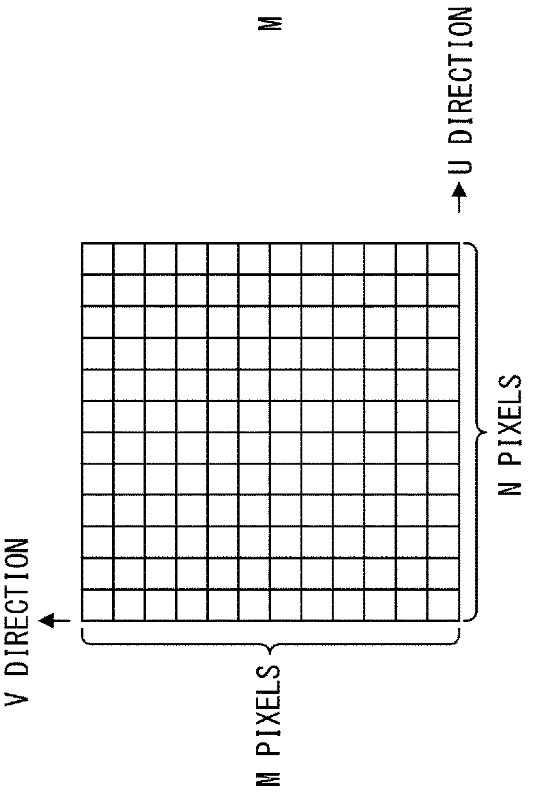
FIGS. 5A to 5D are diagrams for illustrating binning and shapes of pixel blocks.

FIG. 5A shows a plurality of pixels in the image sensor 13 when binning is not performed. The image sensor 13 has M×N pixels. That is, N rows of pixels are arranged in the U direction. M lines of pixels are arranged in the V direction.

Figure 5B:
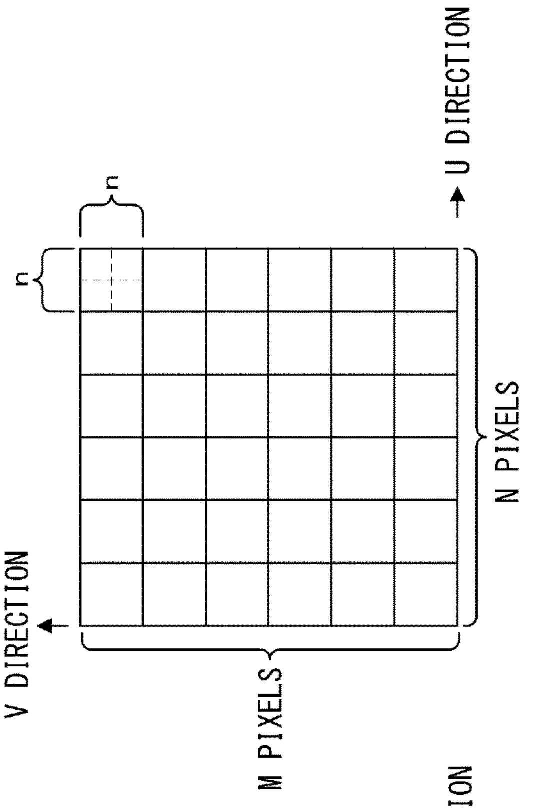

FIG. 5B shows general binning. General binning is processing mainly performed by a digital still camera, etc., and a ratio between a resolution in the U direction and a resolution in the V direction is maintained. As shown in FIG. 5B, one image signal (luminance value) synthesized for each block of n×n pixels is output. Since the binning is executed such that the ratio between the resolution in the U direction and the resolution in the V direction is maintained, an aspect ratio of an image before binning and an aspect ratio after binning are maintained. In addition, there is an advantage that a reading speed becomes approximately 1/(n×n). On the other hand, the measurement accuracy in the U direction in addition to the V direction decreases. In particular, such general binning is not suitable for an application where a high measurement accuracy in the U direction is also required, such as in the optical displacement meter 100 of the light sectioning method.

Figure 5C:
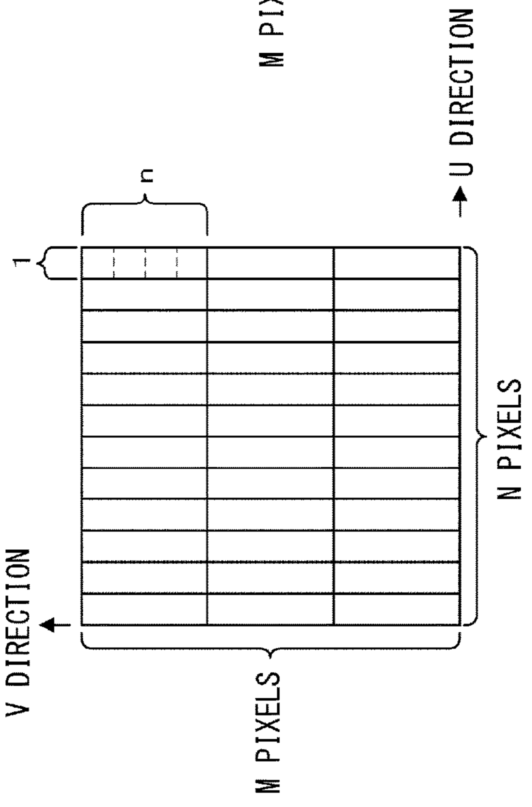

FIG. 5C shows the binning of the embodiment. In the embodiment, the ratio (binning ratio) between the resolution in the V direction and the resolution in the U direction is 1:n. That is, the image sensor 13 outputs a light receiving result for each pixel block including n pixels arranged in the V direction. In this way, it is possible to speed up the reading in the V direction while suppressing the decrease in the measurement accuracy in the U direction. The profile generating section 27 of the control section 2 can obtain correct height information by multiplying the height obtained in the V direction by n.

Figure 5D:
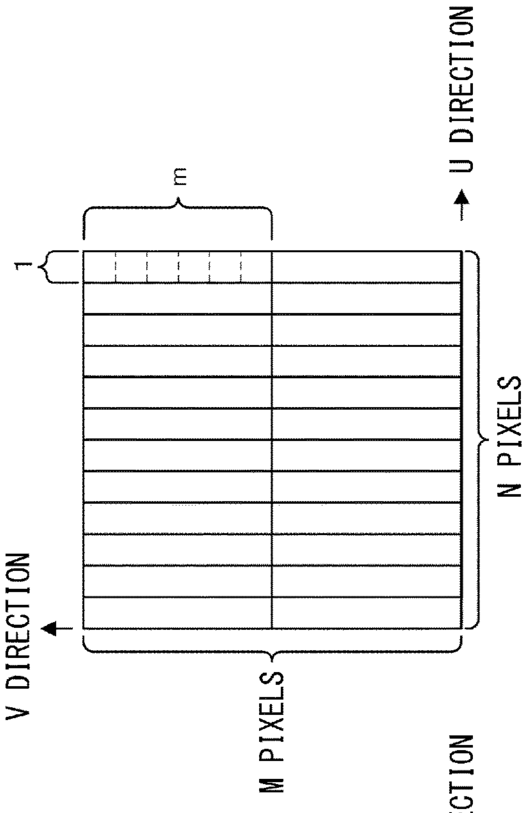

FIG. 5D shows the binning of the embodiment. A user may select between the 1:n binning shown in FIG. 5C and the 1:m binning shown in FIG. 5D through the operating section 5. That is, the selecting section 28 may select a binning ratio according to a user instruction. Here, m is a positive integer greater than n. There is also an advantage that noise in the V direction is reduced by the binning processing. In addition, the selecting section 28 may switch between ON and OFF of the binning processing according to a user instruction. For example, it is possible to set a state in which the binning processing is ON as a high-speed mode and a state in which the binning processing is OFF as a high-accuracy mode, and to make the user select a mode.

<Position (Height Calculation)>

Figure 6:
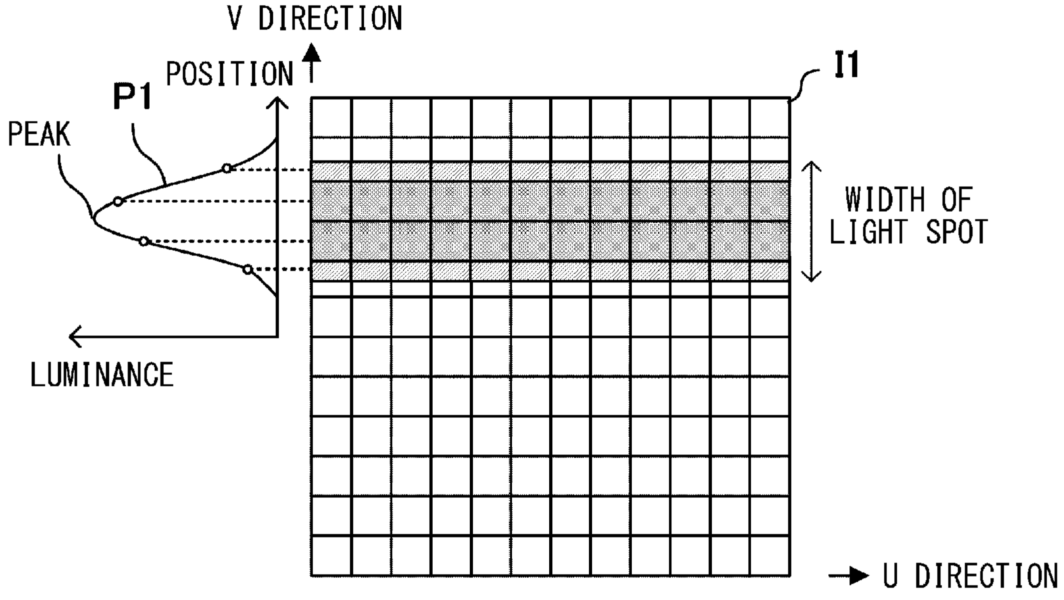
FIG. 6 is a diagram illustrating a method of detecting a peak position.

FIG. 6 is a diagram illustrating a method of calculating a height included in the profile from the image I1. The slit light L1 has a certain width in the Y direction. For this reason, the width of the light spot brought by the reflected light L2 to the image sensor 13 also becomes a width that extends over a plurality of pixels. Therefore, the CPU 25 (the peak detecting section 26) of the control section 2 obtains an approximate curve P1 indicating a change in the luminance value from the luminance value of each pixel, and calculates a position in the V direction which brings a peak value in the approximate curve P1. The approximate curve P1 is obtained by performing curve fitting on a plurality of sample values and the like. The position in the V direction which brings the peak value indicates the height of the workpiece W. The CPU 25 (the peak detecting section 26) obtains the approximate curve P1 for each position in the U direction, and calculates a position (height) in the V direction that brings a peak value from the approximate curve P1. By executing the arithmetic processing at each position in the U direction, one profile is obtained. Such arithmetic processing may be called sub-pixel processing.

<Relation Between Binning and Approximate Curve>

Figure 7:
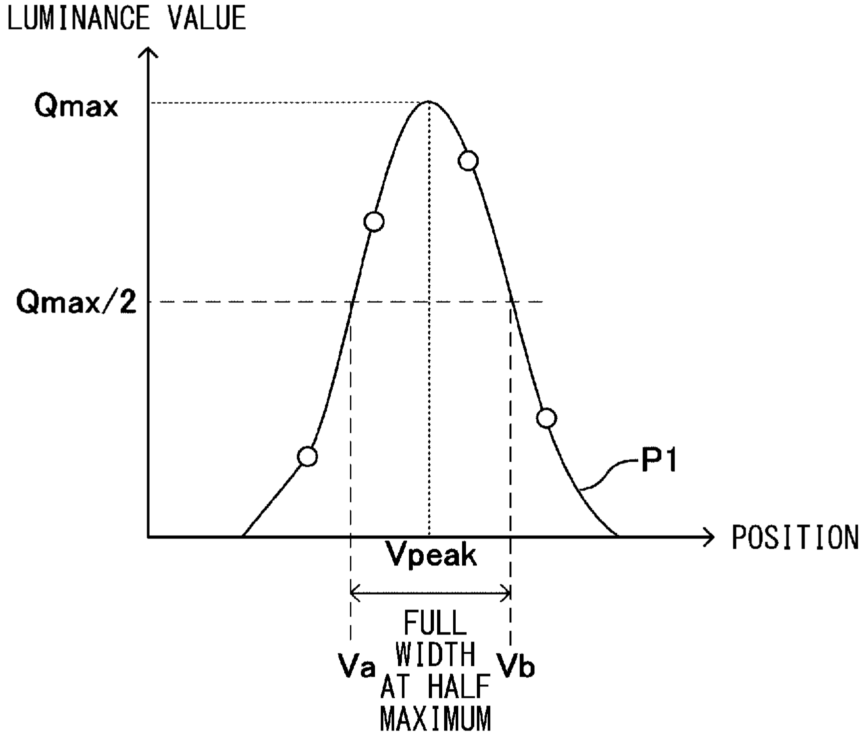
FIG. 7 is a diagram illustrating a method of detecting a peak position.

FIG. 7 shows the approximate curve P1 indicating a relation between a position in the V direction and a luminance value. Here, the approximate curve P1 is obtained from four sampling values. By the way, when the binning of the embodiment is applied, the number of pixels in the V direction decreases, and thus the number of sampling values that can be used for obtaining the approximate curve P1 also decreases. That is, as the value of n increases, although the reading of the luminance value is speeded up, the calculation accuracy of the approximate curve P1 decreases. Therefore, there is a trade-off relation between the binning parameter n and the calculation accuracy of the approximate curve P1. In FIG. 7, the peak value of the approximate curve P1 is Qmax. A full width at half maximum of the approximate curve P1 is a distance between two positions Va and Vb in the V direction when the luminance value is half of the peak value Qmax (Qmax/2). FIG. 7 also shows a peak position Vpeak which is a position in the V direction that brings the peak value Qmax. The peak detecting section 26 obtains the approximate curve P1, and calculates the peak position Vpeak that brings the peak value Qmax from the approximate curve P1.

Figure 8:
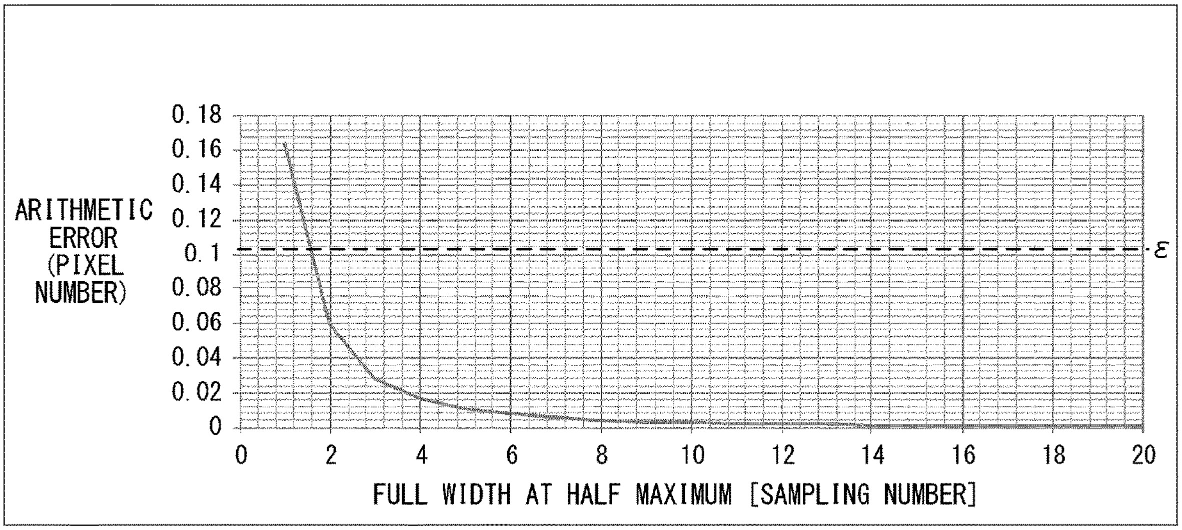
FIG. 8 is a diagram showing a relation between a full width at a half maximum and an arithmetic error.

FIG. 8 shows a relation between a full width at half maximum of an approximate curve and an arithmetic error of the peak value Qmax obtained from the approximate curve P1 in a certain sub-pixel processing. As shown in FIG. 8, as the full width at half maximum (sampling number) is increased, the arithmetic error decreases. However, the sampling number at which an improved effect of the arithmetic error can be expected is about 5. A reduction in the arithmetic error cannot be expected even though the sampling number is 6 or greater, and a disadvantage that the time for reading becomes longer increases. In order to accurately obtain a peak position from an approximate curve, it is important that a sampling interval is sufficiently small. When the sampling interval is already sufficiently small, further reducing the sampling interval will not contribute to an improvement of accuracy. By applying binning only in the V direction and reducing the sampling interval to such an extent that a sufficient peak detection accuracy can be maintained, the reading speed can be made faster without lowering the detection accuracy. In addition, by not applying binning in the U direction, a measurement resolution in the X direction can be maintained.

In general, when an error of a factor other than the arithmetic error is ε, the arithmetic error is required to be sufficiently smaller than ε. According to FIG. 8, when the full width at half maximum is 2 or greater, the arithmetic error becomes smaller than ε. In other words, the sampling number for the full width at half maximum of the approximate curve P1 should be 2 or greater and 5 or smaller.

<Idea of Display Processing with Binning>

Figure 9:
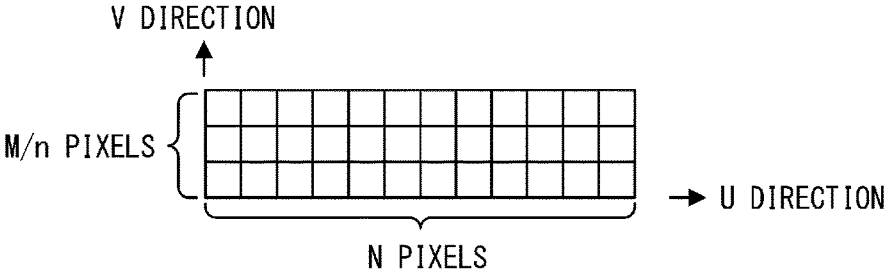
FIG. 9 is a diagram illustrating a plurality of pixels included in an output image.

FIG. 9 shows a plurality of pixels included in a display image when displaying a profile. As described above, 1:n binning is executed in the embodiment, and thus the number of pixels in the V direction decreases from M to M/n. Here, the shape of one block in the image sensor 13 becomes rectangular due to binning. However, it is presumed that each pixel in the output image is square. Therefore, when the output image read by binning is displayed on the display device 3 as it is, the height direction of the image is compressed.

Figure 10:
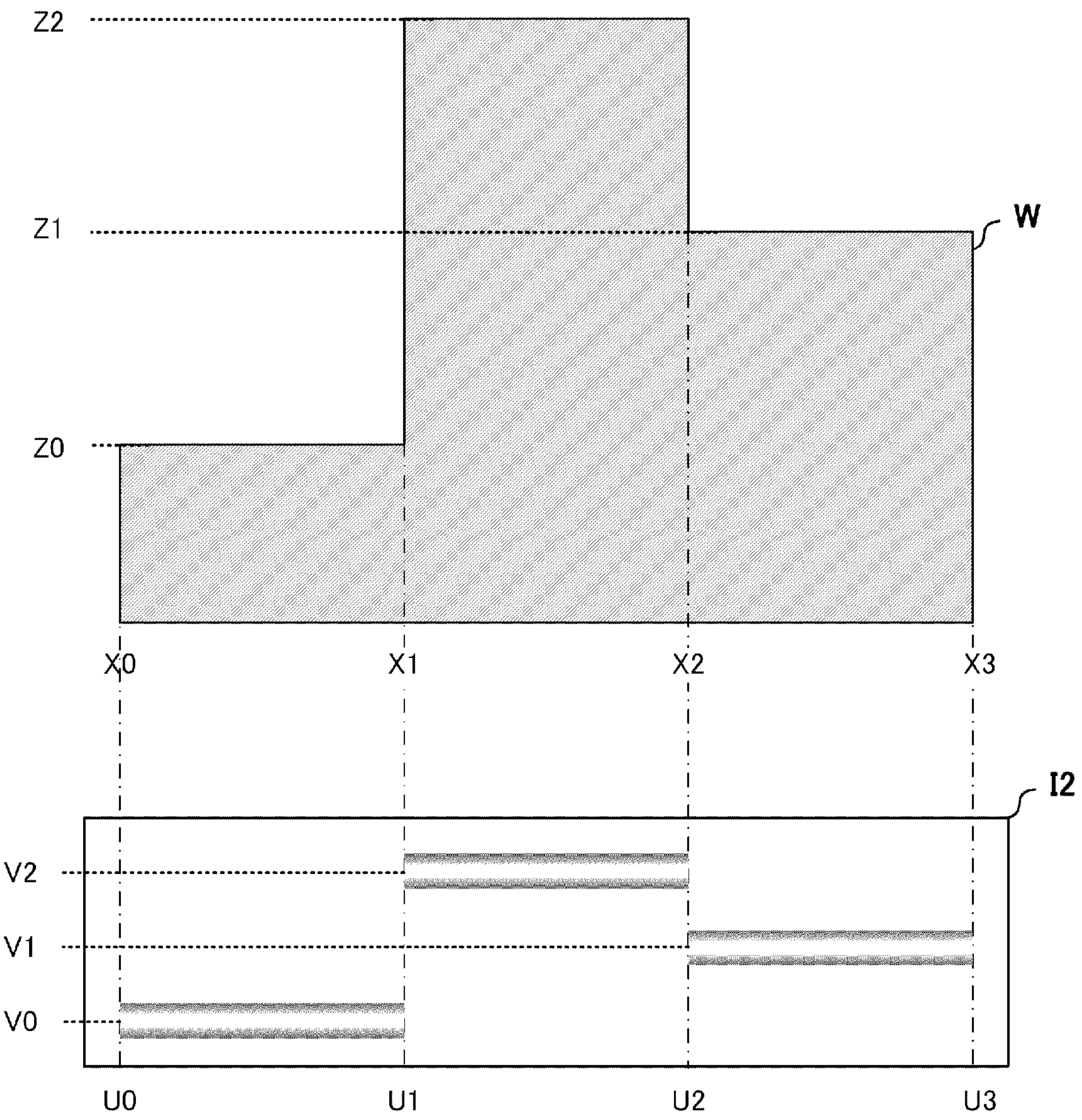
FIG. 10 is a diagram illustrating a relation between an output image and an actual profile of a workpiece.

FIG. 10 is a diagram illustrating a relation between the workpiece W and an output image I2 with a height compressed due to binning. Comparing FIG. 3 and FIG. 10, an actual cross-sectional shape of the workpiece W in the image I1 in FIG. 3 matches the profile shown by the image I1. Therefore, the user can easily determine whether a profile measured by the optical displacement meter 100 is correct as an actual profile of the workpiece W. In contrast, the profile shown by the image I2 shown in FIG. 10 is different from the actual profile of the workpiece W. As a result, it is difficult for the user to visually determine whether the measured profile is correct from the image displayed on the display device 3.

Therefore, the CPU 25 (UI section 29) increases the number of pixels in the V direction in the output image I2 by n times to display on the display device 3, thereby making the scale of the profile in the output image I2 consistent with the scale of the actual profile of the workpiece W. The pixel value of one pixel is copied into n pixel values. As a result, the user can easily visually determine whether the profile measured by the optical displacement meter 100 is correct as the actual profile of the workpiece W.

<Summary>

[Viewpoint 1]

As shown in FIG. 1, the optical displacement meter 100 is an example of an optical displacement meter of a light sectioning method that measures a profile of the X-Z cross section of a measuring object conveyed in the Y direction based on the principle of triangulation. The light source 6 is an example of a light source that irradiates the measuring object with the slit light L1 parallel to both the X direction and the Z direction. Further, the light source 6 is an example of a light source that irradiates the measuring object with slit light having a width in the X direction. The image sensor 13 is an example of an image sensor that receives the reflected light L2 from the measuring object. As shown in FIG. 5A, etc., the image sensor 13 has a plurality of pixels two-dimensionally arranged in the U direction corresponding to the X direction and the V direction corresponding to the Z direction. Moreover, the image sensor 13 outputs a light receiving amount (e.g., luminance value) of the reflected light by the plurality of pixels. The peak detecting section 26 functions as a detecting unit that detects, as a peak position, a position of a pixel in the V direction that is a peak of the light receiving amount for each of the plurality of pixel rows arranged in the U direction. The profile generating section 27 functions as a generating unit that generates a profile of the X-Z cross section from each position of the plurality of pixel rows in the U direction and the peak position in the V direction. As shown in FIG. 5C and FIG. 5D, the resolution in the V direction of the image sensor 13 is lower than the resolution in the U direction of the image sensor 13. That is, the image sensor 13 outputs a light receiving amount after executing binning to make the resolution in the V direction lower than the resolution in the U direction. In this way, it is possible to speed up the reading in the V direction without a decrease in the measurement accuracy in the U direction.

[Viewpoint 2]

As shown in FIG. 5C, the ratio of the binning between the U direction and the V direction for the image sensor 13 may be 1:n (n is an integer of 2 or greater). The image sensor 13 may be configured to output one light receiving amount for every n pixels arranged in the V direction. In this way, it is possible to speed up the reading in the V direction without a decrease in the measurement accuracy in the U direction.

As described with reference to FIG. 7 and FIG. 8, n may be an integer of 2 or greater and 5 or smaller. This makes it possible to achieve both a high-speed reading in the V direction and a measurement accuracy in the V direction.

<Viewpoint 3>

The optical displacement meter may include a high-speed mode in which the binning is executed and reading of the light receiving amount from the image sensor 13 is speeded up, and a high-accuracy mode in which the reading of the light receiving amount from the image sensor 13 is performed without executing the binning. In this case, the optical displacement meter may include a selecting unit (e.g., a user interface, etc.) that receives a selection of the high-speed mode or the high-accuracy mode. This will allow the user to select whether to have a higher speed or to have a higher accuracy.

[Viewpoint 4]

The selecting section 28 may function as a selecting unit that selects any one of 1:n and 1:m (m is an integer greater than n) as a binning ratio between the U direction and the V direction. This makes it possible to select the binning ratio as the user wishes.

As described with reference to FIG. 7 and FIG. 8, n is an integer of 2 or greater, and smaller than a full width at half maximum in a distribution of the light receiving amount (e.g., the approximate curve P1). This makes it possible to achieve both the high-speed reading in the V direction and the measurement accuracy in the V direction.

[Viewpoint 5]

As shown in FIG. 5C and FIG. 5D, the image sensor 13 may be set so as to execute binning in the V direction without executing binning in the U direction. This makes it possible to speed up the reading in the V direction while suppressing a decrease in the measurement accuracy in the U direction.

As shown in FIG. 5A, each of the plurality of pixels is a square pixel. As a result, an image sensor for acquiring a still image can be easily used as the image sensor 13 for the optical displacement meter 100 of the embodiment.

As shown in FIG. 5C and FIG. 5D, the image sensor 13 may be designed such that each of the plurality of pixels is a rectangular pixel whose length in the V direction is larger than the length in the U direction. In a pixel block including a plurality of square pixels, there is a region between adjacent pixels that is not used for light reception. On the other hand, by using rectangular pixels, a light receiving area increases, and thus the light receiving sensitivity and dynamic range increase.

[Viewpoint 6]

The peak detecting section 26 may be configured to determine an approximate curve indicating a change in the light receiving amount in the V direction by performing sub-pixel processing on a plurality of light receiving amounts in the V direction, and to detect the peak position which is a peak of the light receiving amount based on the approximate curve. As a result, the peak position is obtained with high accuracy, and thus the measurement accuracy of the profile is improved.

[Viewpoint 7]

As described with reference to FIG. 3 and FIG. 10, the display device 3 and the UI section 29 of the CPU 25 which function as display units that display an image showing the profile of the X-Z cross section may display a profile image generated by stretching the image in the V direction based on a ratio between the resolution in the U direction and the resolution in the V direction. As a result, the user can easily determine whether the profile measured by the optical displacement meter 100 is correct as an actual profile of the workpiece W.

What is claimed is:

1. An optical displacement meter of a light sectioning method which measures a profile of an X-Z cross section of a measuring object conveyed in a Y direction based on a principle of triangulation, the optical displacement meter comprising:

a light source which irradiates the measuring object with slit light having a width in an X direction;

an image sensor that receives reflected light from the measuring object, the image sensor having a plurality of pixels two-dimensionally arranged in a U direction corresponding to the X direction and a V direction corresponding to a Z direction, and outputting a light receiving amount of the reflected light by the plurality of pixels, wherein the width of a light spot brought by the reflected light to the image sensor becomes a width that extends over a plurality of pixels;

a detecting unit which detects, as a peak position, a position of a pixel in the V direction that is a peak of the light receiving amount for each of a plurality of pixel rows arranged in the U direction; and a generating unit which generates a profile of the X-Z cross section from each position of the plurality of pixel rows in the U direction and the peak position in the V direction, wherein the image sensor outputs a light receiving amount after executing binning to make a resolution in the V direction lower than a resolution in the U direction by applying the binning only in the V direction.

2. The optical displacement meter according to claim 1, wherein a ratio of the binning between the U direction and the V direction for the image sensor is 1:n (n is an integer of 2 or greater), and the image sensor is configured to output one light receiving amount for every n pixels arranged in the V direction.

3. The optical displacement meter according to claim 1, further comprising a selecting unit which receives a selection of a high-speed mode in which the binning is executed and reading of the light receiving amount from the image sensor is speeded up, or a high-accuracy mode in which the reading of the light receiving amount from the image sensor is performed without executing the binning.

4. The optical displacement meter according to claim 3, further comprising a selecting unit which selects any one of 1:n and 1:m (m is an integer greater than n) as a binning ratio between the U direction and the V direction.

5. The optical displacement meter according to claim 1, wherein the image sensor is set so as to execute binning in the V direction without executing binning in the U direction.

6. The optical displacement meter according to claim 1, wherein the detecting unit is configured to determine an approximate curve indicating a change in the light receiving amount in the V direction by performing sub-pixel processing on a plurality of light receiving amounts in the V direction, and to detect the peak position which is a peak of the light receiving amount based on the approximate curve.

7. The optical displacement meter according to claim 1, further comprising a display unit which displays an image showing the profile of the X-Z cross section, wherein the display unit displays a profile image generated by stretching the image in the V direction based on a ratio between the resolution in the U direction and the resolution in the V direction.

* * * * *